United States Patent [19]

Lippoldt

[11] 4,264,364
[45] Apr. 28, 1981

[54] THERMALLY STABLE SMOKE SUPPRESSANT ADDITIVES TO POLYMERIC COMPOSITIONS

[75] Inventor: Richard F. Lippoldt, Norman, Okla.

[73] Assignee: Indian Head Inc., New York, N.Y.

[21] Appl. No.: 83,582

[22] Filed: Oct. 11, 1979

[51] Int. Cl.$^3$ .............................................. C09K 3/28
[52] U.S. Cl. .................................. 106/16; 106/18.12; 106/18.19; 106/18.21; 106/18.23; 106/18.27; 106/18.28; 106/163 R; 252/8.1; 260/45.75 E; 260/45.75 P; 260/45.75 W; 260/DIG. 24
[58] Field of Search ................ 106/16, 18.12, 18.19, 106/18.21, 18.23, 18.27, 18.28, 163 R; 252/8.1; 260/45.75 E, 45.75 P, 45.75 W, DIG. 24

[56] References Cited

U.S. PATENT DOCUMENTS

| | | | |
|---|---|---|---|
| 3,468,843 | 9/1969 | Busse | 260/45.75 W |
| 3,821,151 | 6/1974 | Mitchell | 260/30.6 R |
| 3,930,028 | 12/1975 | Ullman et al. | 426/41 |
| 3,983,086 | 9/1976 | Dickens | 260/45.75 P |
| 3,983,185 | 9/1976 | Dorfman et al. | 260/45.75 P |
| 3,993,607 | 11/1976 | Florence | 260/45.75 P |
| 4,013,815 | 3/1977 | Dorfman et al. | 260/45.75 P |

*Primary Examiner*—Lorenzo B. Hayes
*Attorney, Agent, or Firm*—William R. Laney

[57] ABSTRACT

A polymer composition which includes, as a smoke suppressing additive, a complex of a Friedel-Crafts halide compound with an organic compound selected from the group which includes quaternary ammonium compounds, quaternary phosphonium compounds, tertiary sulfonium compounds, organic orthosilicates and the partially hydrolyzed derivatives of organic orthosilicates, or a combination of these.

14 Claims, No Drawings

THERMALLY STABLE SMOKE SUPPRESSANT ADDITIVES TO POLYMERIC COMPOSITIONS

BACKGROUND OF THE INVENTION

1. Field of the Invention

This invention relates to polymer compositions, and in a more specific, though non-limiting aspect, to additive materials which beneficially modify the properties exhibited by polymer compositions which undergo carbonization upon pyrolysis, such properties being, most notably, rate of consumption and quantity of smoke evolution.

2. Brief Description of the Prior Art

Much effort has been expended in discovering and developing useful fire retardant and smoke retardant polymer compositions, and numerous examples of these compositions have appeared in the literature, with some of them being in commercial use. As technology has become more sophisticated, various additives which affect the pyrolysis of polymers have been evaluated on the basis of an increasing number of objectives. Among these objectives are low cost of additives, low rate of polymer consumption, low quantity of smoke evolution, improved char formation characteristics, improved smoke compositions in the sense of reduced toxicity, and improved processibility. Since halogenated polymers produce dense smoke and some noxious hydrogen halides upon pyrolysis, much effort has recently been focused on reducing the quantity of smoke evolved in the pyrolysis of such polymers. Dense smoke seriously hampers fire fighting efforts, constitutes a real danger of asphyxiation or suffocation, and can obscure escape routes from a burning building or vehicle.

Various materials have heretofore been proposed as additives to polymers for the purpose of reducing the amount of smoke which is produced upon pyrolysis of these materials, and for reducing the rate at which the material is consumed. The production of smoke and the consumption rate are related, of course, in that the total volume of smoke produced over a given period of time will be a function of both the amount of smoke yielded per unit of material consumed during pyrolysis, and also the rate at which the material is consumed during pyrolysis.

Iron oxide has frequently been added to polyvinylchloride formulations, alone or in combination with other materials, to reduce the quantity of smoke evolved during pyrolysis of the polymer. The proposed types and amounts of iron oxide which have been said to be useful have varied widely. Thus, U.S. Pat. No. 4,055,538 discloses that red iron oxide or yellow iron oxide having an average particle size of from about 0.01 to about 800 microns can be utilized in combination with melamine molybdate as a smoke retardant additive to rigid PVC and polyvinylidine chloride polymer compositions. The rigid PVC can be filled or unfilled. The additive composition can contain as much as 99% by weight iron oxide, and from about 0.1 to about 20 phr of the additive composition is used in the polymer. Other patents disclosing the use of iron oxides for smoke reduction in polymers are U.S. Pat. Nos. 3,983,086; 3,821,151, and 3,993,607. Still other patents teach the use of iron oxide in combination with other metal oxides. For example, U.S. Pat. No. 3,903,028 discloses the use of iron oxide in combination with either copper oxide or molybdenum oxide in reducing smoke evolution from PVC during pyrolysis.

Iron oxides have thus been used in various forms and combinations as smoke suppressants in plastic. It has been recognized as highly probable that such metal oxides, when present in halogenated polymers, are converted to metal halides by hydrogen halide generated during pyrolysis of the polymer. Thus, it is speculated that iron oxide added to PVC is converted to iron chloride by hydrogen chloride liberated during the burning. It has also been implied that such metal halides catalyze smoke suppression. It is known, however, that iron chloride is an excellent dehydrohalogenation catalyst, and therefore causes premature degradation of halogenated polymers when used directly, instead of through conversion from iron oxide initially placed in the polymer.

U.S. Pat. No. 4,013,815 to Dorfman proposes to use up to 5 weight percent iron or iron compound in a halogen-containing polyester of a polycarboxylic compound and a polyhydric alcohol for smoke suppression purposes. A preferred form of iron compound for smoke suppression is a ferric sulfate hydrate, and iron oxide and iron carboxylates are also mentioned. Ferric chloride and ferric oxychloride are described as having desirable fire retardant properties, but adversely affecting the stability or cure of the polymer compositions. Such iron compounds are said to be useful in this context only in an inactive form, such as when encapsulated or complexed with another compound. Encapsulating the compounds with gelatin or other polymeric materials, or alternatively, complexing the ferric chloride or ferric oxychloride with nitro compounds or aromatic ethers or amines is specifically suggested. The example cited is an amine salt of ferric chloride.

Another Dorfman patent (U.S. Pat. No. 3,983,185) describes the use of a fire retardant metallic compound added to a halogen-containing polyester of a polycarboxylic acid and a polyhydric alcohol. The polyester contains more than 4 weight percent of halogen. The fire retardant additive is either an iron compound, an antimony compound and/or a copper compound. Iron salts said to be suitable include, inter alia, ferric sulfate hydrates, ferric fluoride, ferrous fluosilicate, ferrous hydroxide, ferrous sulfate, ferrous tartrate, ferrous stannate, ferrous chloride and ferrous ammonium sulfate. Iron oxides are described as especially useful compositions. Suitable copper salts include cupric chloride, cupric bromide, copper chloride dihydrate, copper sulfate pentahydrate, copper hydroxide chloride, basic copper chloride, copper oxychloride, copper carbonate and copper borate. Especially useful are the copper oxides. The antimony compounds described include, among others, antimony trioxide, antimony pentoxide, antimony sulfides, antimony tribromide, antimony trichloride, antimony tetrachloride, antimony trifluoride, antimony pentafluoride, antimony triiodide, antimony pentaiodide, antimony oxychloride and antimony trisulfate. This patent further indicates that while many of these compounds have fire retardant properties, they may adversely affect the stability or cure of the polymer compositions. It is indicated, however, that such additives can be initially incorporated in an inactive form, such as encapsulated or complexed with another compound, in order to avoid this undesirable aspect of their use. Ferric chloride, copper acetylacetonate, cuprous chloride, cupric nitrate, cupric acetate, copper acrylate, copper naphthenate, copper stearate, and antimony sulfate thus can be encapsulated with gelatin or other polymeric materials. It is also taught that these compounds can be complexed with nitro compounds or aromatic ethers or amines. A cited example of a suitable complex is an amine salt of ferric chloride. In some instances, certain iron, copper or antimony compounds normally detrimental to the stability or cure of the resin can be employed in small amounts.

An article in Plastics Engineering, February 1979, pages 43–47, refers to ferric chloride as a smoke suppressant for vinyl polymers. This article fails to note that ferric chloride operates to degrade the polymer during processing, and, of course, no method for curing this problem is suggested.

The foregoing prior art references show that iron and other metal compounds have been used as smoke suppressant additives for plastics. The most effective of these has been generally recognized to be iron oxide. Metal halides, while recognized as having some capacity as smoke suppressants, have nevertheless often been avoided since they cause premature degradation of halogentated polymers.

SUMMARY OF THE INVENTION

The present invention provides a polymer composition which includes a Friedel-Crafts halide complexed with a complexing agent for deactivating the halide up to a temperature which allows the polymer to be processed, while permitting the halide to function effectively as a smoke suppressant above that temperature.

DESCRIPTION OF THE PREFERRED EMBODIMENTS

The polymers which are susceptible to the practice of the present invention are typically and broadly all those in which smoke generation upon pyrolytic carbonization of the polymer is a problem. Such polymers which undergo carbonization are to be contrasted with those which depolymerize substantially directly to the monomer, such as polystyrene and polyethylene. In describing these resins and the additives of the present invention, standard nomenclature used in the art will be employed. Thus, amounts of added components in the resinous composition will be referred to as phr, i.e., parts per hundred of resin. In the utilization of this invention, similar results are achieved with chemically similar polymers. Plastics known to respond to the smoke suppressing properties of iron compounds, for example, will exhibit a similar response to the catalysts of this invention. The invention is not limited to the use of a particular type or amount of resin composition additives of a conventional nature, such as extenders or fillers. These extenders or fillers are well known in the art and are used to impart flexibility or rigidity to the finished resins. Typical of polymers in which the additive complexes of the invention are useful are polyvinyl chloride, polyvinylidene chloride, polyvinylidene chloride, and other carbonizing polymers, such as polyesters, polyurethanes and cellulosics.

The present invention utilizes as a smoke suppressant catalyst a Friedel-Crafts halide. Friedel-Crafts halides are well known in the chemical art to be those metal halides in the presence of which a Friedel-Crafts reaction will occur. Friedel-Crafts reactions involve condensation of alkyl or acyl halides with benzene and its homologues by the process of alkylation and acylation. Friedel-Crafts halides include metal halides of iron, zinc, titanium, copper, nickel, cobalt, tin, aluminum, antimony and cadmium, which are non-hydrous and non-ionic. Thus, iron fluoride (ionic) and hydrated iron chlorides (hydrous) are metal halides which cannot function as Friedel-Crafts halides.

As mentioned above, Friedel-Crafts halides are known to be good dehydrohalogenation catalysts. This property is responsible for premature degradation of halogenated polymers when such catalysts are incorporated therein in unmodified form. Such degradation occurs when the temperature of the polymer is raised during processing. A typical upper limit temperature required for processing PVC, for example, is about 200° C., and usually a temperature of at least 190° C. will be experienced in the course of processing. In some other polymers, the Friedel-Crafts halide catalyst, although catalytically decreasing the evolution of smoke upon pyrolysis of the polymer, tends to undesirably accelerate deleterious oxidative reactions during processing of the polymer.

To prevent premature degradation of the treated polymer, the Friedel-Crafts halides of the present invention are initially complexed. Such complexing deactivates the halide as a dehydrohalogenation catalyst and oxidation accelerator up to the upper limits of the required processing temperatures. At some higher temperature, the Friedel-Crafts halide is liberated from the complex. This temperature is preferably less than 400° C. in order to allow the Friedel-Crafts portion of the catalyst to function effectively in smoke suppression. Separation of the Friedel-Crafts halide from the complex can occur by several means, such as thermal cleavage or cleavage by hydrogen halide attack, or both. Once separated from the complex the Friedel-Crafts halide acts as a catalyst in reducing smoke generation. Of course, the ultimate criterion for adequate complex stability is processibility of the plastic without undue degradation, oxidation, discoloration, etc.

The agent used in complexing the halide is chosen from among the quaternary ammonium compounds, quaternary phosphonium compounds, tertiary sulfonium compounds, organic orthosilicates, the partially hydrolyzed derivatives of organic orthosilicates, or a combination of these. Examples of quaternary ammonium compounds include tetramethyl ammonium chloride, bromide, methylsulfate and acetate. Other examples are tri(hydroxyethyl) methyl ammonium chloride, bromide, methylsulfate and acetate. Other appropriate alkyl, substituted alkyl or aralkyl substituent groups and mixtures thereof can be utilized. Other anions forming quaternary ammonium compounds are also suitable. An especially suitable and preferred complex is that which is formed between $FeCl_3$ and tri(hydroxyethyl) methyl ammonium chloride which is a liquid and thus is especially convenient for incorporation in various resin formulations.

Examples of quaternary phosphonium complexing compounds include tetrabutyl phosphonium chloride and bromide. Again, other alkyl, substituted alkyl or aralkyl substituent groups and anions forming quaternary phosphonium compounds are also appropriate. Examples of tertiary sulfonium compounds are trimethylsulfonium chloride and bromide. Examples of organic orthosilicates, or their partially hydrolized derivatives, include tetraethyl orthosilicate and tetrabutyl orthosilicate. Aryl analogues of the orthosilicates, such as phenyl or m-tolyl orthosilicates, are also suitable.

In order to minimize an undesirable tendency toward thermal degradation of the onium compound complexes by the Hoffman degradation mechanism, it is preferred that the aliphatic portion of any substituent not contain more than four carbon atoms, and aliphatic substituents which contains only one or two carbon atoms are most preferred.

Preferably the complexing agent is a quaternary ammonium salt, such as a tetramethyl ammonium salt. An example of a tetramethyl ammonium salt is tetramethyl ammonium chloride. The chloride salt is preferred.

The concentration of Friedel-Crafts halide, per se, added to the resin is preferably in the range of from about 0.1 phr to about 2.0 phr. This concentration has been found generally effective, regardless of the filler or extender used in the polymer. The mole ratio of complexing agent to metal halide varies according to what type of complexing agent is used, and also according to which of the Friedel-Crafts halides are used. In many cases, however, the mole ratio is one-to-one of complexing agent to Friedel-Crafts halide. Complexation occurs by a coordination bonding mechanism.

A preferred Friedel-Crafts metal halide is ferric chloride. When complexed with tetramethyl ammonium chloride in a one-to-one mole ratio, ferric chloride is especially effective in reducing smoke generation. Additionally, the ferric chloride and tetramethyl ammonium chloride are generally more available and less expensive than other compounds used in forming various other operative complexes of the invention. As has been previously indicated, however, the ferric chloride complex with tri(hydroxyethyl) methyl ammonium chloride is highly suitable because it is a liquid and thus is more easily used.

In preparing the complex compositions, it is desirable to dissolve the Friedel-Crafts metal halide in a solvent such as acetonitrile. When the complexing agent is next added as a solid, it dissolves as the complex is formed, usually quite rapidly with a minimum of agitation. After complexing, the catalyst can be coated on a mineral substrate then incorporated in the resin, or it may be deposited directly upon finely divided resin.

As an alternative to the use of acetonitrile as the solvent medium in which the complexes are prepared, alcohols, ethers, ketones, thionyl chloride and an aqueous solution of hydrochloric acid are also suitable to varying degrees, although, in general, acetonitrile is preferred.

It has been surprisingly determined that the complexes used in the invention, except for the partially hydrolized organic orthosilicate complexes, are nonhygroscopic. Prior literature references strongly suggest that such complexes should be vary hygroscopic and highly deliquescent. Such water affinity would make the complexes undesirable additives to most types of polymer compositions where very low water and moisture tolerances levels are characteristic of processing conditions or final product. In this regard, when the complexes are prepared in an aqueous hydrochloric acid solution, the precipitated complex is preferably thoroughly dried to remove occluded moisture before it is incorporated in the resin formulation.

The following examples are illustrative of the practice of the invention, but are not intended as limiting with respect to its scope.

EXAMPLE 1

To a solution of ferric chloride (162.4 anhydrous basis, 1.0 mole) in about three liters of acetonitrile was added solid tetramethyl ammonium chloride (109.5 gm. anhydrous basis, 1.0 mole). The mixture was stirred at ambient temperature for about ½ hour to obtain a clear, light yellow solution of a complex of tetramethyl ammonium chloride and ferric chloride.

EXAMPLE 2

The catalyst complex solution prepared in Example 1 was slurried with about 90 lbs. of suspension PVC beads. The solvent was then removed by distillation to deposit the catalyst complex on the resin surface at an effective level of about 0.4 phr of ferric chloride. This product was suitable for dry blending with additional compounding chemicals.

EXAMPLE 3

To a catalyst complex acetonitrile solution prepared as described in Example 1 were added 200 gm. of finely divided silica. The silica was dispersed by agitation in a Waring blender at about 20,000 rpm. The resulting slurry was stripped of solvent by distillation. The residual solid was comminuted in a Waring blender to achieve the smallest possible particle size. This product was suitable for dry blending, or for dispersion in liquids used in formulating the resin.

EXAMPLE 4

A mixture of anhydrous $FeCl_3$ (135 gm., 0.83 mole) and $FeCl_3.6H_2O$ (46 gm., 0.17 mole) was dissolved in about 3000 ml. of acetonitrile. Tetraethyl orthosilicate (208.3 gm., 1.0 mole) was added to the acetonitrile solution. The solution was stirred at ambient temperature for 30 minutes, and then at 60° C. for 1 hour. After this, the solution was cooled and 684 gm. of Kaolin were added to the solution. The mixture was agitated in a Waring blender at about 20,000 rpm for one minute. The solvent was then removed from the slurry in a rotary evaporator evacuated to about 10 mm. of $H_g$. The solid residue was comminuted in a Waring blender at about 20,000 rpm to achieve the smallest possible particle size.

The product thus prepared was suitable for use in dry-blending or for dispersion in liquids for incorporation into a synthetic resin blend preparatory to processing.

EXAMPLE 5

The complexes prepared in Examples 2, 3 and 4 were made up in a standard rigid, non-extended PVC formulation for purposes of evaluation of smoke reduction characteristics, using an Arapahoe smoke chamber. Complexes of other compounds with ferric chloride (1:1 mole ratio) were also similarly prepared with the complex in each case being incorporated in the resin formulation in a quantity sufficient to provide a ferric chloride effective level of 0.4 phr. Each of the resin formulations contained 100 parts of the basic suspension-type PVC resin, 2.0 parts of a conventional stabilizer, 1.8 parts of conventional lubricants, 11.0 parts of conventional resin modifiers and 5.0 parts of filler.

Each of the formulations was processed to a finished resin, and tabs of the resins were tested in an Arapahoe smoke chamber with 2 minutes exposure to flame. The smoke generated was then measured and determined as a percent of the total weight loss of the resin during pyrolysis, and a comparision made to a control sample (Run 1) which contained all of the formulation components except the catalyst complex. The results of these tests are set forth in Table I.

TABLE I

| Run | Catalyst System Complexing Compound* | Substrate | Combustion Data % Smoke | % Reduction |
|---|---|---|---|---|
| 1 | No catalyst used | — | 5.04 | — |
| 2 | TMAC | S₁O₂ | 2.66 | 47.2 |
| 3 | Hydrolyzed TEOS | Kaolin | 2.59 | 48.6 |
| 4 | TMAC | None | 1.73 | 65.7 |
| 5 | TMSC | None | 1.71 | 66.1 |
| 6 | TBPC | None | 3.60 | 28.6 |
| 7 | TMAMS | None | 3.42 | 32.1 |
| 8 | THMAMS | None | 3.36 | 33.3 |
| 9 | THMAC | None | 2.05 | 59.3 |

*THMAC = Tri(hydroxyethyl)methyl ammonium chloride
THMAMS = Tri(hydroxyethyl)methyl ammonium methosulfate
TMAC = tetramethyl ammonium chloride
TEOS = tetraethyl orthosilicate
TPMAC = tripropylmethyl ammonium chloride
TMSC = trimethylsulfonium chloride
TBPC = tetrabutyl phosphonium chloride
TMAMS = tetramethyl ammonium methosulfate From Table I it will be noted that both the tetramethyl ammonium chloride-ferric chloride complex and the tetramethyl sulfonium chloride-ferric chloride complex reduced the quantity of smoke produced by more than 65 percent.

EXAMPLE 6

A series of additional complexes were prepared using tetramethyl ammonium chloride and various Friedel-Crafts halide compounds. These complexes were then incorporated in a rigid, extended polyvinyl chloride formulation which contained 100 parts of the resin, 0.6 parts stabilizer, 3.5 parts of conventional lubricants, 1.0 part filler and 25 parts of calcium carbonate as an extender. The complexes utilized were incorporated in each of the formulations, except for the samples used in Runs 3 and 10, hereinafter described, in an amount such that the Friedel-Crafts catalyst portion of the complex was present in the formulation at a level of 0.4 phr. In the case of the sample used in Run 10, two of the complexes were concurrently incorporated in the formulation. In this run, the tetramethyl ammonium chloride-ferric chloride complex was utilized at a level of 0.2 phr and tetramethyl ammonium chloride-aluminum chloride complex was incorporated at a level of 0.5 phr.

In these tests of the rigid, extended PVC formulations, the product resins produced were subjected to 45 seconds of flame exposure in an Arapahoe smoke chamber.

The results of these smoke tests of the rigid, extended PVC formulations containing the complexes are set forth in Table II.

TABLE II

| Run | Catalyst System Metal Halide Complexed (phr) | Mole Ratio | Substrate | Combustion Data % Smoke | % Reduction |
|---|---|---|---|---|---|
| 1 | None | — | — | 5.14 | — |
| 2 | FeCl₃(0.4) | 1:1 | None | 2.41 | 53.1 |
| 3 | AlCl₃(0.5) | 1:1 | None | 3.62 | 29.6 |
| 4 | SnCl₄(0.4) | 2:1 | None | 3.65 | 29.0 |
| 5 | CoCl₂(0.4) | 1:1 | None | 3.80 | 26.0 |
| 6 | ZnCl₂(0.4) | 1:1 | None | 3.54 | 31.1 |
| 7 | NiCl₂(0.4) | 1:1 | None | 4.14 | 19.5 |
| 8 | CuCl₂(0.4) | 1:1 | None | 3.76 | 26.8 |
| 9 | FeCl₃(0.4) | 1:1 | Kaolin | 2.13 | 58.6 |
| 10 | FeCl₃(0.2) AlCl₃(0.5) | 1:1 1:1 | None | 2.57 | 50.0 |

EXAMPLE 7

In order to measure the deactivating capability of the complexing material combined with the Friedel-Crafts catalyst to prevent low temperature activity, resin particles having the catalyst complex deposited thereon were placed in a capillary tube and observed at constantly increasing temperatures. This "hot stage evaluation" was accomplished using a Fisher-Johns melting point apparatus with a copper disc drilled to allow insertion of the capillary tubes. Breakdown of the catalyst complex was determined by a blackening of the resin which indicates the occurrence of catalytic degradation.

The results of tests of a number of the catalyst complexes determined by hot stage evaluation are set forth in Table III.

TABLE III

| Run | Catalyst System Complexing Reactant | Friedel-Crafts Catalyst (phr) | Mole Ratio | Dehydrochlorination Degradation, °C. |
|---|---|---|---|---|
| 1 | — | None | — | 175 |
| 2 | — | FeCl₃(0.35) | — | 145 |
| 3 | — | FeCl₃(0.1) | — | 180 |
| 4 | NH₄Cl | FeCl₃(0.4) | 1:1 | 175 |
| 5 | TMAC | FeCl₃(0.4) | 1:1 | >200 |
| 6 | TMAC | AlCl₃(0.5) | 1:1 | >200 |
| 7 | TMAC | SnCl₄(0.4) | 2:1 | >>200 |
| 8 | TMAC | CoCl₂(0.4) | 1:1 | >200 |
| 9 | TMAC | NiCl₂(0.4) | 1:1 | >200 |
| 10 | TMAC | ZnCl₂(0.4) | 1:1 | >190 |
| 11 | TMAC | CuCl₂(0.4) | 2:1 | 200 |
| 12 | TBPC | FeCl₃(0.4) | 1:1 | >200 |
| 13 | TMAMS | FeCl₃(0.4) | 1:1 | >200 |
| 14 | TMSC | FeCl₃(0.4) | 1:1 | >200 |
| 15 | THMAMS | FeCl₃(0.4) | 1:1 | >200 |
| 16 | THMAC | FeCl₃(0.4) | 1:1 | >200 |

From the results set forth in Table III, it will be perceived that ferric chloride alone, or complexed with ammonium chloride, catalyzes the dehydrochlorination of the PVC resin at temperatures below the temperature developed during the usual processing of the resin, which is about 195° C.-200° C. Complexes of the catalyst in which quaternary ammonium salts are employed for complexing several types of Friedel-Crafts compounds are generally shown to be thermally stable to temperatures well in excess of 200° C. and thus do not adversely interfere with processing.

The present invention provides several advantages over the prior art. First the use of a Friedel-Crafts halide avoids the need to convert a metal oxide to halide by generating hydrogen halide during combustion through the decomposition of the halide-containing resin. This avoids the need for expensive halogenated ingredients in plastics which are not intrinsically halogen-containing. Second, use of a Friedel-Crafts halide avoids the problem of hydrogen halide deprivation in plastics extended with such basic fillers as calcium carbonate. In other words, such use prevents calcium carbonate from reducing the effectiveness of the metal oxide catalyst precursor by decreasing the amount of hydrogen halide available for forming the Friedel-Crafts compound. Third, the present invention allows many possible variations in complexing agents and catalyst configurations. Thus, great latitude in designing catalysts for specific applications is provided. Fourth, by eliminating the need for in situ dynamic conversion of a metal oxide to a halide, the quantity of functioning metal halide catalyst can be more precisely controlled.

The foregoing disclosure is merely illustrative of the principles of this invention, and is not to be interpreted in a limiting sense.

What is claimed is:

1. A polymer composition consisting essentially of:
   a polymeric resin which carbonizes upon pyrolysis to yield smoke and char; and
   a coordination complex of a Friedel-Crafts halide and a complexing compound selected from the group consisting of quaternary ammonium compounds, quaternary phosphonium compounds, tertiary sulfonium compounds and organic orthosilicate compounds, said complex being incorporated in the polymer at a concentration adequate to include from about 0.1 to about 2.0 phr of the Friedel-Crafts halide in the polymer, and wherein said complex undergoes decomposition to yield said Friedel-Crafts halide at a temperature exceeding about 200° C.

2. A polymer composition as defined in claim 1 wherein said polymeric resin contains chemically bound halogen.

3. A polymer composition as defined in claim 2 wherein said polymeric resin is polyvinyl chloride.

4. A polymer composition as defined in claim 3 wherein said complex undergoes decomposition to yield said Friedel-Crafts halide at a temperature of from about 200° C. to about 400° C.

5. A composition as defined in claim 1 wherein said Friedel-Crafts halide is selected from the group consisting of iron halides, zinc halides, titanium halides, copper halides, nickel halides, cobalt halides, tin halides, aluminum halides, antimony halides and cadmium halides.

6. A composition as defined in claim 5 wherein said Friedel-Crafts halide is a chloride compound.

7. A composition as defined in claim 6 wherein said Friedel-Crafts halide is ferric chloride.

8. A composition as defined in claim 1 wherein said quaternary and tertiary compounds are substituted by alkyl groups each containing from one to four carbon atoms.

9. A composition as defined in claim 8 wherein said complexing agent is a tetramethyl ammonium salt.

10. A composition as defined in claim 1 wherein said polymeric resin is selected from the group consisting of polyesters, polyurethanes and cellulosics.

11. A composition as defined in claim 1 wherein said complex is a liquid complex of ferric chloride and tri(hydroxyethyl) methyl ammonium chloride.

12. A composition as defined in claim 5 wherein said quaternary and tertiary compounds are substituted by alkyl groups each containing from one to four carbon atoms.

13. A smoke-inhibited polymer composition consisting essentially of:
    polyvinyl halide resin;
    a stabilizer compound;
    a filler compound; and
    a smoke suppressant additive selected from the group of complexes which includes the complex of tetramethyl ammonium chloride with ferric chloride in a 1:1 mole ratio, the complex of partially hydrolyzed tetraethyl orthosilicate with ferric chloride in a 1:1 mole ratio, the complex of trimethyl sulfonium chloride with ferric chloride in a 1:1 mole ratio, the complex of tri(hydroxyethyl) methyl ammonium chloride with ferric chloride in a 1:1 mole ratio, the complex of tetramethyl ammonium methosulfate with ferric chloride in a 1:1 mole ratio, the complex of tetrabutyl phosphonium chloride with ferric chloride in a 1:1 mole ratio, the complex of tripropylmethyl ammonium chloride with ferric chloride in a 1:1 mole ratio, the complex of tri(hydroxyethyl) methyl ammonium methosulfate with ferric chloride in a 1:1 mole ratio, the complexes with tetramethyl ammonium chloride, in a 1:1 mole ratio, of ferric chloride, of aluminum chloride, of cobalt chloride, of zinc chloride, of nickel chloride, of cuprous chloride, the complex of tetramethyl ammonium chloride with tin chloride in a mole ratio of 2:1, and mixtures of said complexes, the complex concentration in said polymer composition being adequate to provide an effective level of the inorganic metal halide part of the complex in the polymer composition of from about 0.1 phr to about 2.0 phr.

14. A composition as defined in claim 13 wherein said composition further contains an inorganic extender material.

* * * * *